United States Patent
Islam et al.

(10) Patent No.: US 10,447,025 B2
(45) Date of Patent: Oct. 15, 2019

(54) DEVICE FOR DISTRIBUTING HYBRID CABLE AND TRANSITIONING FROM TRUNK CABLE TO JUMPER CABLE WITH OVERVOLTAGE PROTECTION

(71) Applicant: CommScope Technologies LLC, Hickory, NC (US)

(72) Inventors: Nahid Islam, Westmont, IL (US); John Hanley, Orland Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 266 days.

(21) Appl. No.: 15/409,997

(22) Filed: Jan. 19, 2017

(65) Prior Publication Data

US 2017/0207619 A1    Jul. 20, 2017

Related U.S. Application Data

(60) Provisional application No. 62/280,549, filed on Jan. 19, 2016.

(51) Int. Cl.
| | |
|---|---|
| *H02H 9/04* | (2006.01) |
| *H02H 3/20* | (2006.01) |
| *H02H 7/20* | (2006.01) |
| *H01Q 1/50* | (2006.01) |
| *H02H 9/00* | (2006.01) |
| *H01T 4/08* | (2006.01) |
| *G02B 6/44* | (2006.01) |

(52) U.S. Cl.
CPC ............ *H02H 3/20* (2013.01); *H02H 7/20* (2013.01); *G02B 6/4416* (2013.01); *G02B 6/4471* (2013.01); *H01Q 1/50* (2013.01); *H01T 4/08* (2013.01); *H02H 9/005* (2013.01); *H02H 9/04* (2013.01)

(58) Field of Classification Search
USPC ....................................... 361/91.1, 117–120
See application file for complete search history.

(56) References Cited

U.S. PATENT DOCUMENTS

| | | | |
|---|---|---|---|
| 5,652,820 A | * 7/1997 | Glaser | G02B 6/4417 385/134 |
| 2012/0200979 A1 | * 8/2012 | Miller | H01C 21/50 361/119 |

(Continued)

*Primary Examiner* — Danny Nguyen
(74) *Attorney, Agent, or Firm* — Myers Bigel, P.A.

(57) ABSTRACT

An OVP module that connects with a hybrid trunk cable includes: a mounting frame; an overvoltage unit mounted in the mounting frame and configured to create an open electrical circuit when experiencing a voltage higher than a predetermined threshold; a first contact configured to receive a first set of power conductors from a hybrid trunk cable; a second contact configured to receive a second set of power conductors from the hybrid trunk cable; a first OVP conductor connected between the first contact and the overvoltage unit; a second OVP conductor connected between the second contact and the overvoltage unit; a third contact configured to receive a first set of power cords; a fourth contact configured to receive a second set of power cords; a third OVP conductor connected between the overvoltage unit and the third contact; and a fourth OVP conductor connected between the overvoltage unit and the fourth contact.

18 Claims, 13 Drawing Sheets

(56) References Cited

U.S. PATENT DOCUMENTS

2014/0055898 A1\* 2/2014 Kostakis .................. H02H 3/20
                                                    361/91.5
2015/0109710 A1\* 4/2015 Politis .................. H02G 15/113
                                                    361/119

\* cited by examiner

DEVICE FOR DISTRIBUTING HYBRID CABLE AND TRANSITIONING FROM TRUNK CABLE TO JUMPER CABLE WITH OVERVOLTAGE PROTECTION

RELATED APPLICATION

The present application claims the benefit of and priority from U.S. Provisional Patent Application No. 62/280,549, filed Jan. 19, 2016, the disclosure of which is hereby incorporated herein in its entirety.

FIELD OF THE INVENTION

The present invention relates generally to power and signal distribution, and more particularly to distribution from hybrid cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. However, in order to use a single hybrid trunk cable, at some point the trunk cable must transition to jumper cables or cords. Typically, these are distributed inside an enclosure that transitions the trunk conductor gauge to the jumper conductor gauge and connects the optical fibers in the trunk to the optical fibers in the jumper cables.

Currently, transitions are achieved by making connections inside the enclosure, requiring it to be opened, cables to be fed/mated to the enclosure, and power and fiber connections to be made, all in the field (e.g., on the top of antenna tower sites near a remote radio unit (RRU)). This practice can create many issues for installers, including time, safety, connection errors (such as loose power connections and/or poor fiber cleaning), and more opportunity for connector damage.

In addition, at some sites it is desirable to provide overvoltage protection (OVP) for the RRU. OVP is usually supplied via a separate mounted enclosure that is connected to the power conductors of a hybrid cable. Jumper cords are then connected from the mounted enclosure to RRUs. These additional connection add time and expense to the interconnection process. It may be desirable to provide additional configurations for providing OVP at the top of an antenna tower.

SUMMARY

As a first aspect, embodiments of the invention are directed to an overvoltage protection module (OVP module) configured to connect with a hybrid trunk cable. The OVP module comprises: a mounting frame; an overvoltage unit mounted in the mounting frame and configured to create an open electrical circuit when experiencing a voltage higher than a predetermined threshold; a first contact mounted in the mounting frame and configured to receive a first set of power conductors from a hybrid trunk cable; a second contact mounted in the mounting frame in electrical isolation from the first contact, the second contact configured to receive a second set of power conductors from the hybrid trunk cable; a first OVP conductor connected between the first contact and the overvoltage unit; a second OVP conductor connected between the second contact and the overvoltage unit; a third contact mounted in the mounting frame and configured to receive a first set of power cords; a fourth contact mounted in the mounting frame in electrical isolation from the third contact, the fourth contact configured to receive a second set of power cords; a third OVP conductor connected between the overvoltage unit and the third contact; and a fourth OVP conductor connected between the overvoltage unit and the fourth contact.

As a second aspect, embodiments of the invention are directed to a transition assembly for interconnecting a hybrid trunk cable and electronic equipment, comprising: an enclosure having first and second ends and a cavity; a hybrid trunk cable comprising first and second sets of pluralities of power conductors and a plurality of optical fibers, wherein the first and second sets of power conductors enter the enclosure at the first end; first and second sets of pluralities of power cords that exit the enclosure at the second end; and an overvoltage protection module (OVP module). The OVP module comprises: a mounting frame; an overvoltage unit mounted in the mounting frame and configured to create an electrical short when experiencing a voltage higher than a predetermined threshold; a first contact mounted in the mounting frame and connected with the first set of power conductors; a second contact mounted in the mounting frame in electrical isolation from the first contact, the second contact connected with the second set of power conductors; a first OVP conductor connected between the first contact and the overvoltage unit; a second OVP conductor connected between the second contact and the overvoltage unit; a third contact mounted in the mounting frame and connected with the first set of power cords; a fourth contact mounted in the mounting frame in electrical isolation from the third contact, the fourth contact connected with the second set of power cords; a third OVP conductor connected between the overvoltage unit and the third contact; and a fourth OVP conductor connected between the overvoltage unit and the fourth contact.

As a third aspect, embodiments of the invention are directed to a transition assembly for interconnecting a hybrid trunk cable and electronic equipment, comprising: an enclosure having first and second ends, first and second side walls, and a cavity; a hybrid trunk cable comprising first and second sets of pluralities of power conductors and a plurality of optical fibers, wherein the first and second sets of power conductors enter the enclosure at the first end; and an overvoltage protection module (OVP module). The OVP module comprises: an overvoltage unit mounted in the enclosure and configured to create an open electrical circuit when experiencing a voltage higher than a predetermined threshold; a first contact mounted in the enclosure and connected with the first set of power conductors and with the connectors; a second contact mounted in the enclosure in electrical isolation from the first contact, the second contact connected with the second set of power conductors and with the connectors; a first OVP conductor connected between the first contact and the overvoltage unit; and a second OVP conductor connected between the second contact and the overvoltage unit.

DETAILED DESCRIPTION

Figure 1:
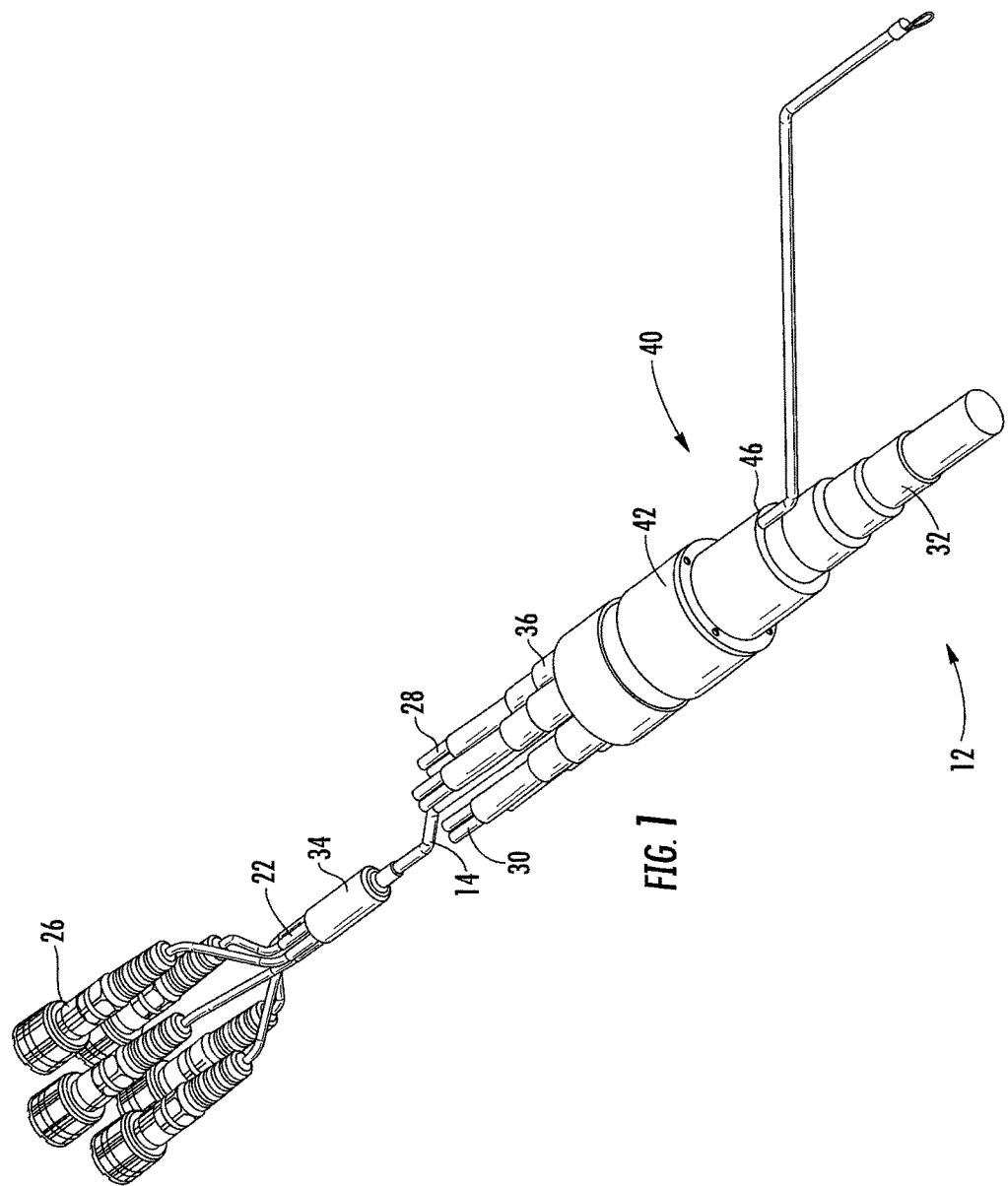
FIG. 1 is a perspective view of a transition assembly according to embodiments of the present invention.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings, a transition assembly, designated broadly at 10, is shown in FIGS. 1-4. The assembly 10 includes a hybrid trunk cable 12, a transition housing 40, power cords 28, fiber optic cords 22, and an overprotection (OVP) module 70 (not shown in FIG. 1). These components are discussed in greater detail below.

Referring to FIG. 1, the transition housing 40 is generally cylindrical and may be formed of any suitable material, including metals and polymers. The transition housing 40 includes a main body 42 that defines a central cavity and an end 46.

The hybrid trunk cable 12, which has a plurality of power conductors 13 (see FIG. 3) and a plurality of optical fibers 14 encased in a jacket 15, enters the transition housing 40 through the end 46. The entry of the hybrid trunk cable 12 into the transition housing 40 may take any number of configurations and may include one or more sleeves 32 or glands for sealing and protection (e.g., a heat shrink sleeve or tube, a crimp sleeve, a polymeric tube, or the like may be suitable).

Figure 2:
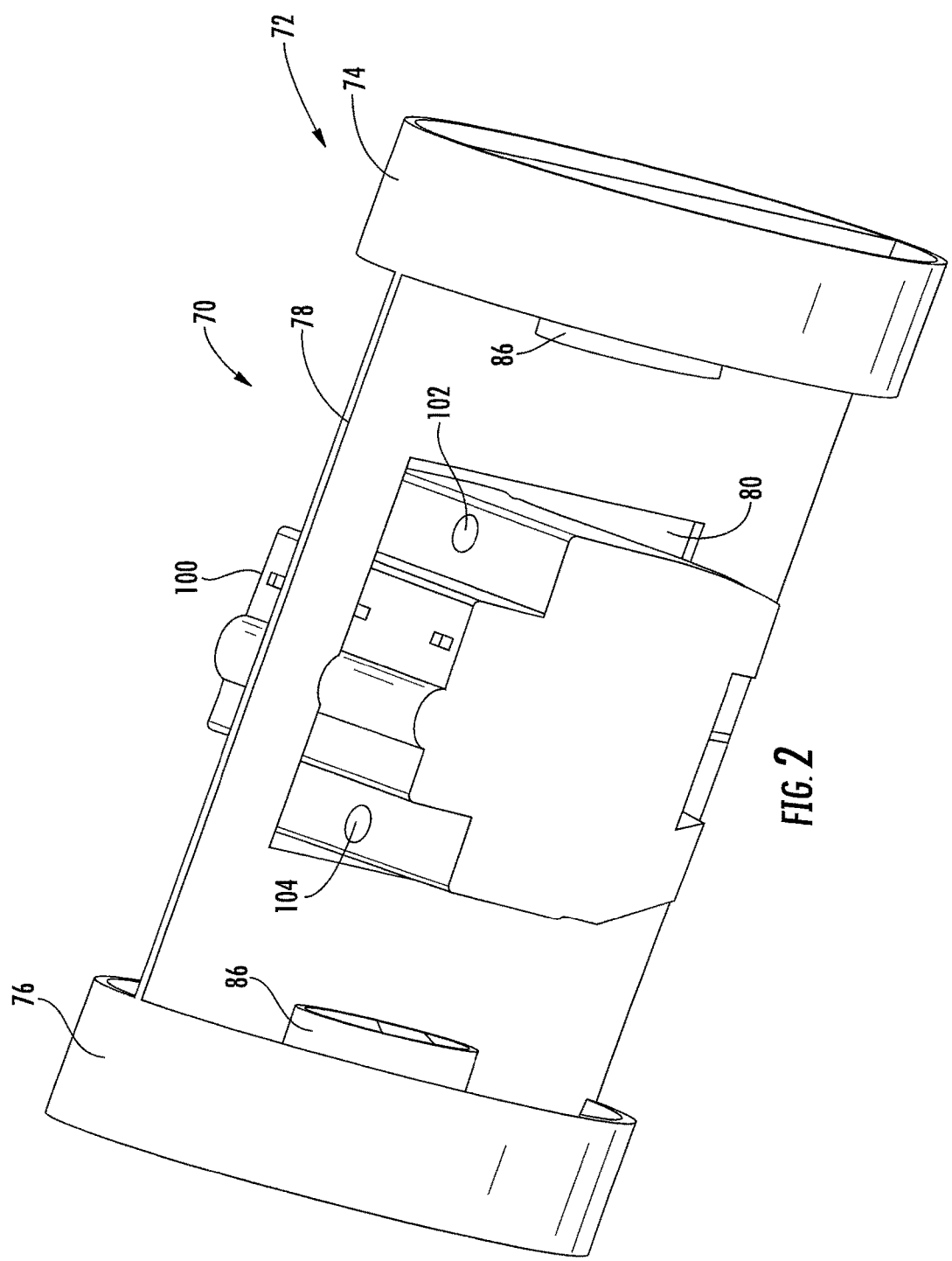
FIG. 2 is a perspective view of an OVP module of the transition assembly of FIG. 1.
Figure 3:
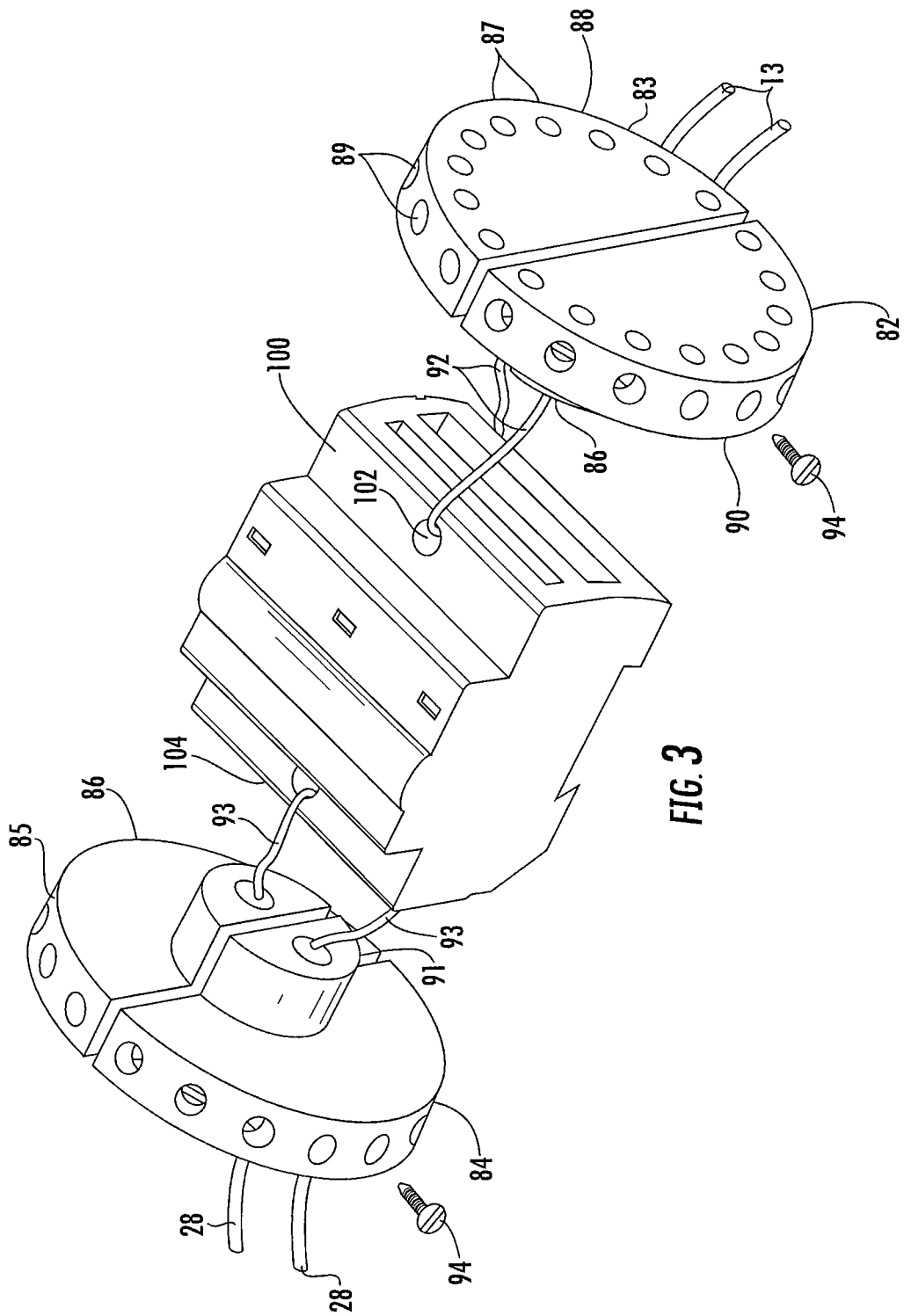
FIG. 3 is an exploded perspective view the OVP module of FIG. 2 with the frame removed.
Figure 4:
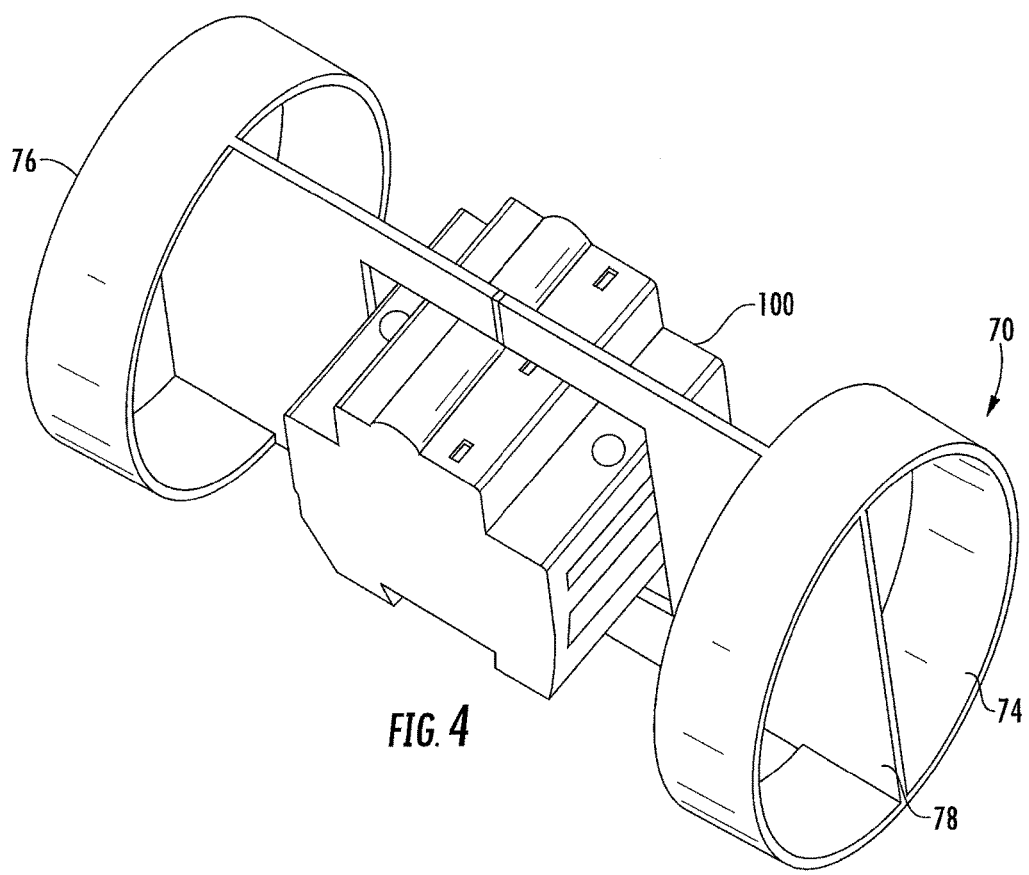
FIG. 4 is a perspective view of the OVP module of FIG. 2 with the contacts removed.

Within the cavity of the transition housing 40, the power conductors 13 of the hybrid trunk cable 12 are routed into the OVP module 70 (see FIGS. 2-4). The OVP module 70 includes a frame 72 with rings 74, 76 and a main panel 78 that spans and divides the rings 74, 76. An opening 80 is located in the central portion of the main panel 78. The frame 72 can be formed of a number of materials; typically the frame is formed of an electrically insulative material, such as a polymeric material.

Referring still to FIGS. 2-4, an OVP unit 100 with two holes 102 at one end and two holes 104 at the opposite end is mounted in the opening 80 (only one hole 102 and one hole 104 are shown herein). The OVP unit 100, which is configured to create an open electrical circuit when experiencing a voltage higher than a predetermined threshold, can take a conventional form known to those of skill in this art and need not be described in detail herein. An exemplary OVP unit is the VAL-MS-T1/T2 48/12.5 ST SPD (Surge Protection Device), available from Phoenix Contact.

Two semicircular contacts 82, 83 are mounted in the rings 74, and two additional semicircular contacts 84, 85 are mounted in the ring 76. A respective semicircular projection 86 extends from the straight edge of each contact 82-85. Receptacles 87 are located on an end surface 88 of each contact 82-85; a securing hole 89 configured to receive a mounting screw 94 extends radially from the arcuate edge 90 of each contact 82-85 to meet a respective receptacle 87. A receptacle 91 is positioned on each projection 86. Notably, the main panel 78 is positioned between the contacts 82, 83 to isolate these components from each other, and is also positioned between the contacts 84, 85 to isolate these contacts from each other (see FIGS. 3 and 4 to envision how the contacts 82-85 are mounted in the frame 72).

As can be envisioned from FIGS. 2-4, the conductors 13 of the hybrid trunk cable 12 are separated, and each conductor 13 is routed to a respective receptacle 87 of the contacts 82, 83 and secured with a screw 94 inserted into a corresponding mounting hole 89. An OVP conductor 92 (shown schematically in FIG. 3) is routed from each of the receptacles 91 of the contacts 82, 83 to a corresponding hole 102 in the OVP unit 100. Another OVP conductor 93 (shown schematically in FIG. 3) is routed from each hole 104 in the OVP unit 100 to the receptacle 91 of the corresponding contact 84, 85. Power cords 28 are inserted into the receptacles 87 in the contacts 84, 85 and secured with screws 94 inserted into the mounting holes 89.

The power cords 28 exit the end of the transition housing 40. The end of the transition housing 40 may be open, and the cavity filled with a potting compound (such as an epoxy) to protect the components inside the cavity, or (as in the illustrated embodiment) the transition housing 40 may have a closed end with holes through which the power cords 28 are routed within sleeves 36 (alternatively, such holes may be sealed with glands, gaskets, a sealing compound, or the like). The power cords 28 are terminated with appropriate connectors 30 (see FIG. 1) or are fashioned into a form appropriate for termination into an RRU or similar equipment.

It can be seen that power signals travelling on the power conductors 13 reach the contacts 82, 83, where they are combined into two signals (one each for contacts 82 and 83); as noted above, the contacts 82, 83 are electrically isolated from each other by the main panel 74. These two combined signals are routed from their respective contacts 82, 83 to the conductors 92, in which they travel to the OVP unit 100. The signals exit the OVP unit 100 and travel through the conductors 93 to the contacts 84, 85 (which, as noted above, are electrically isolated from each other), where they are separated as they are routed to the power cords 28 and subsequently to RRUs or other tower-top equipment. Thus, it can be seen that the same number of electrical power signals that enter the transition housing 40 also exit the transition housing 40, but are combined into two signals for routing through the OVP module 70 in order to simplify the overall design.

The optical fibers 14 of the hybrid trunk cable 12 are routed to the fiber optic connectors 26. The optical fibers 14 can be separated and routed directly to the connectors 26, or, alternatively, they may be spliced with fiber optic cords via conventional splicing means mounted in the transition housing 40.

Typically, the hybrid trunk cable 12 is routed from the base of an antenna tower or similar structure to a location adjacent a piece of equipment (such as an RRU) mounted on the structure. The power cords 28 are then connected to the equipment via the connectors 30 and the optical fibers 14 are connected to the equipment via the fiber optic connectors 26.

Those skilled in this art will appreciate that the transition assembly 10 may take other forms. The transition housing 40 may take a different shape. The entry of the hybrid trunk cable 12 into the transition housing 40 may be configured differently, as may the exit of the power cords 28 from the transition housing 40. In some embodiments, the cavity 44 of the transition housing 40 may be at least partially filled with a potting compound, such as an epoxy, to maintain environmentally sealed conditions. A different OVP unit may be employed.

Figure 5:
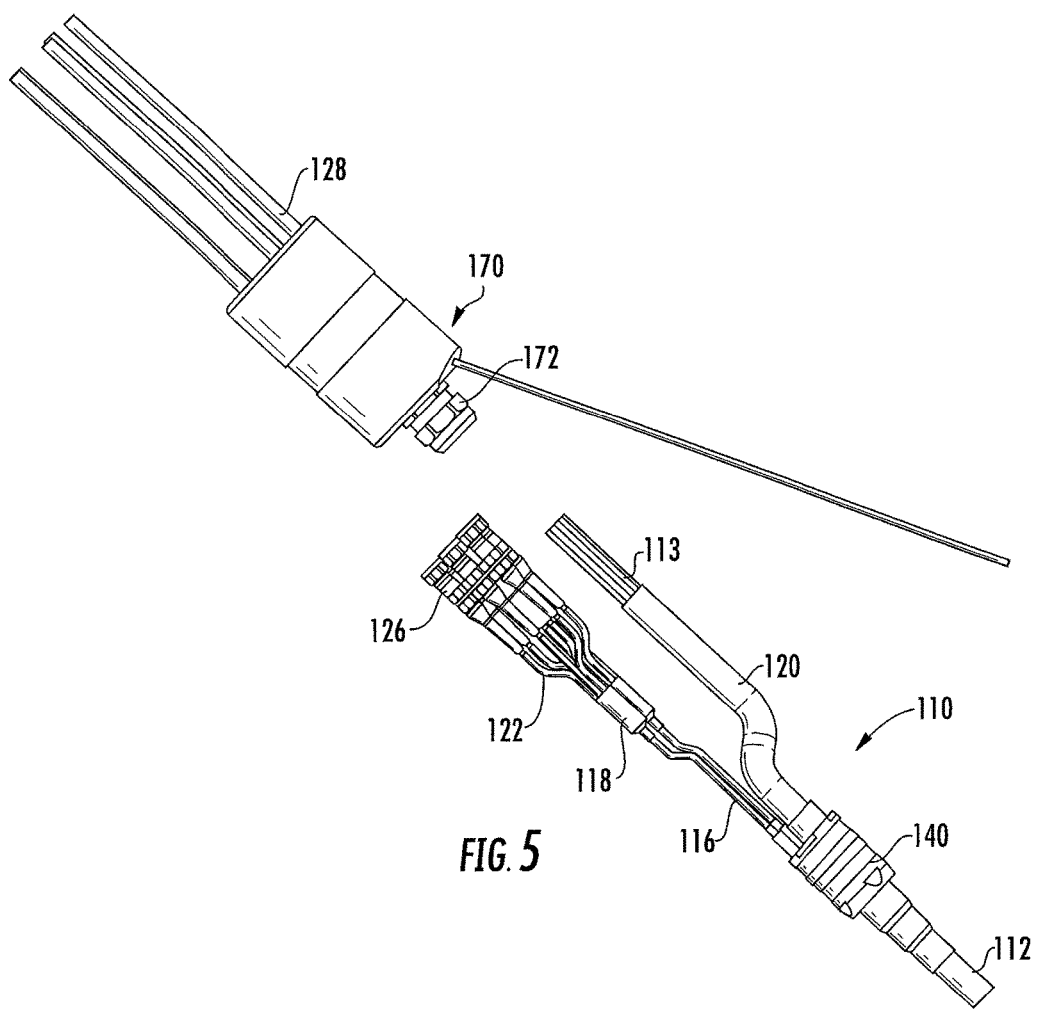
FIG. 5 is a perspective view of a transition assembly according to alternative embodiments of the invention.

Referring now to FIG. 5, another embodiment of a transition assembly, designated broadly at 110, is illustrated below. The assembly 110 includes a hybrid trunk cable 112 of similar construction to that discussed above. The assembly 110 further includes a breakout housing 140 in which the optical fibers of the hybrid trunk cable 112 are separated from the power conductors 113 of the hybrid trunk cable 112. In the illustrated embodiment, the optical fibers are separated into two fiber subunits 116 of six optical fibers each, which are subsequently broken out further at transition housings 118 into individual fiber optic cords 122 with terminations 126. The power conductors 113 are passed through the breakout housing 140 and exit as a single power conductor subunit 120. The power conductor subunit 120 is routed to an OVP assembly 170 that houses an OVP unit (not shown) similar or identical to the OVP unit 100 described above. As shown in FIG. 5, the power conductor subunit 120 enters one end of the housing of the OVP assembly 170 via a cable gland 172. Within the OVP assembly 170, the power conductors 113 of the power conductor subunit 120 are connected with the OVP unit in the manner described above.

Power cords 128 are also connected with the OVP unit and exit the opposite end of the OVP assembly 170. The power cords 128 and fiber optic cords 122 can be connected with an RRU or other equipment in the manner described above.

Figure 6:
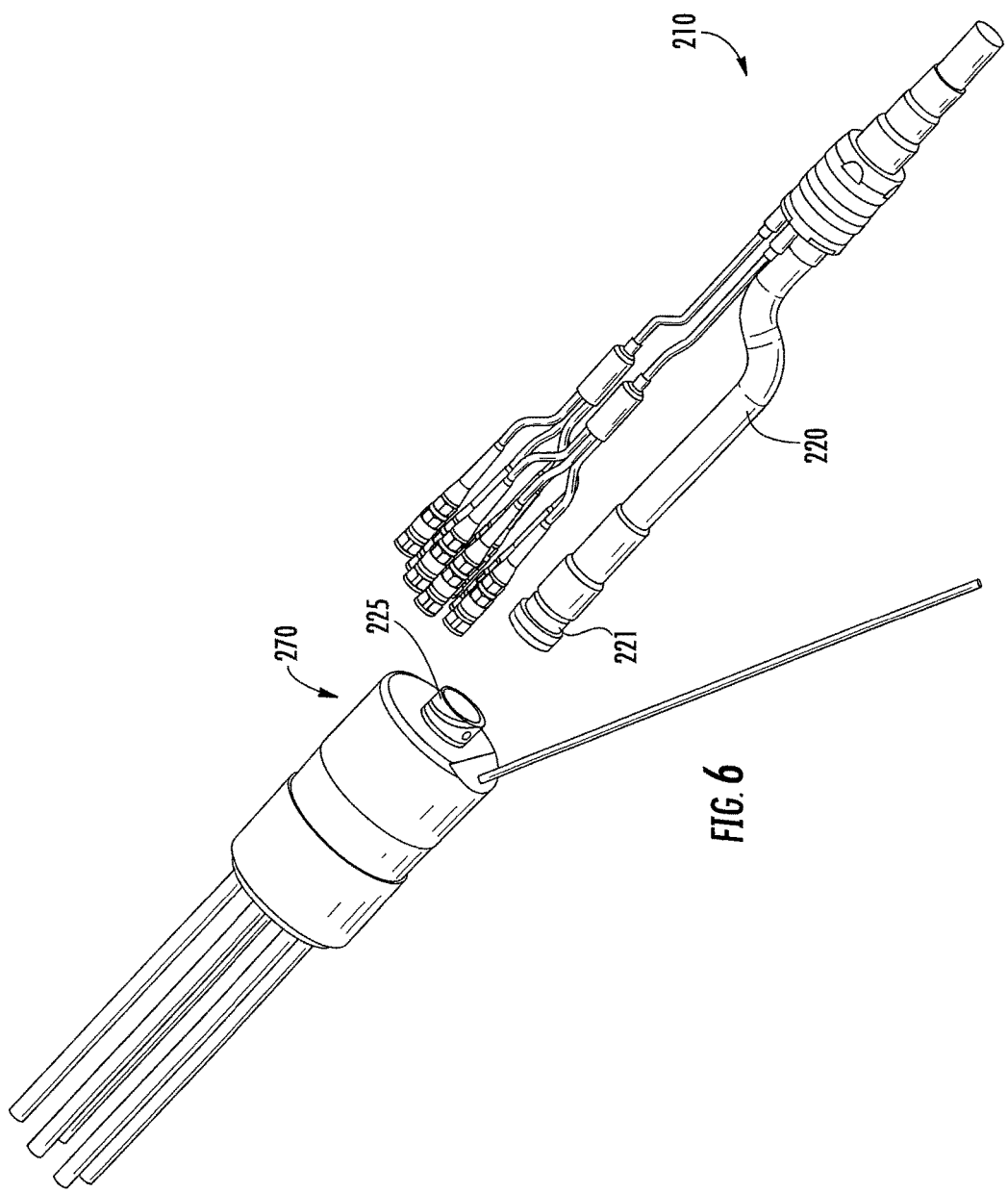
FIG. 6 is a perspective view of a transition assembly according to additional embodiments of the invention.

Referring now to FIG. 6, another embodiment of a transition assembly, designated broadly at 210, is illustrated therein. The transition assembly 210 is similar to the transition assembly 110 with the exception that the power conductor subunit 220 is terminated with a connector 221, and the OVP assembly 270 includes a mating connector 225. Conductors are routed from the connector 225 to the OVP unit (not shown) inside the OVP assembly 270.

Figure 7:
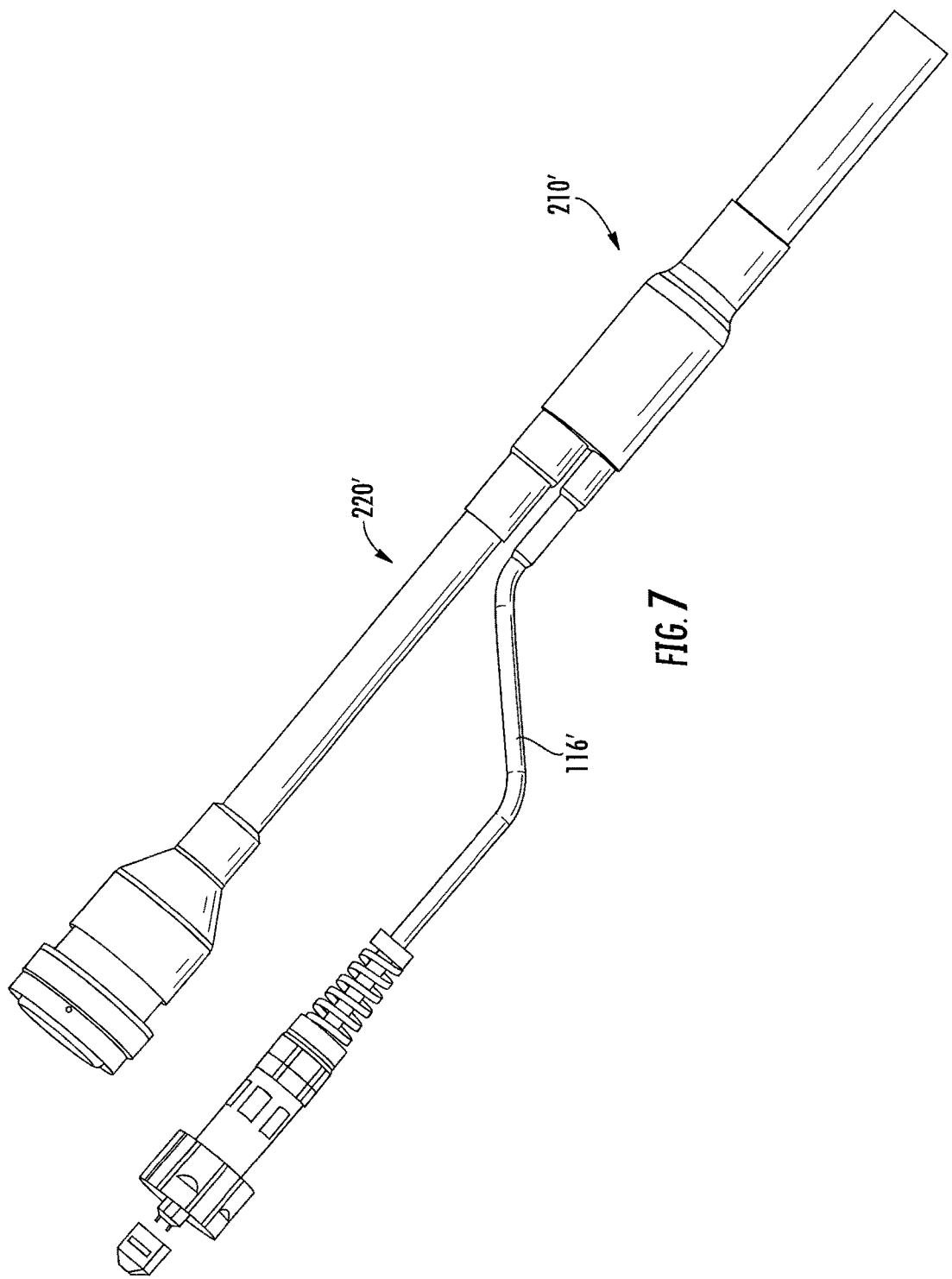
FIG. 7 is a perspective view of a hybrid cable to be used with the transition assembly of FIG. 6 according to further embodiments of the invention.
Figure 8:
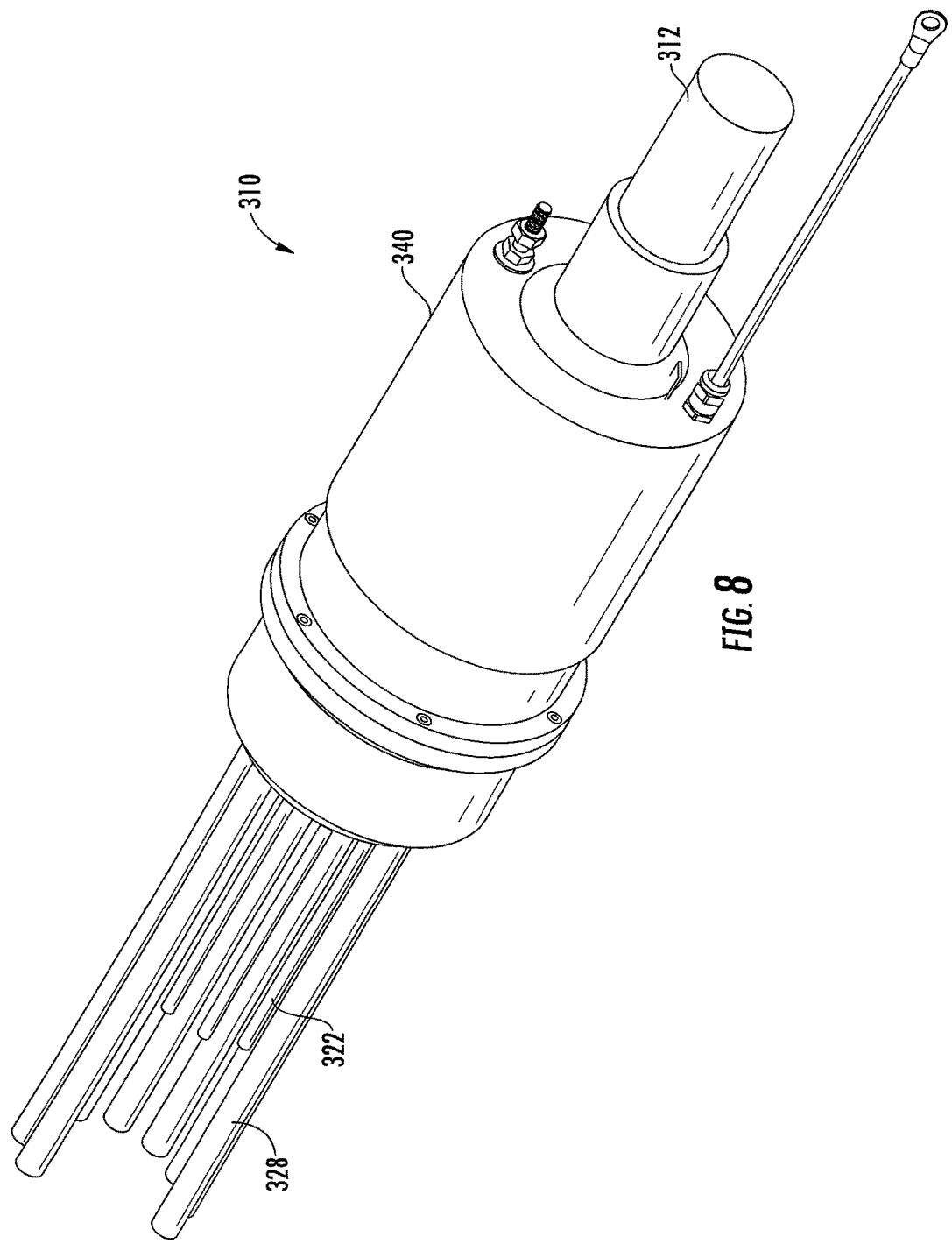
FIG. 8 is a front perspective view of a transition assembly according to still further embodiments of the invention.
Figure 9:
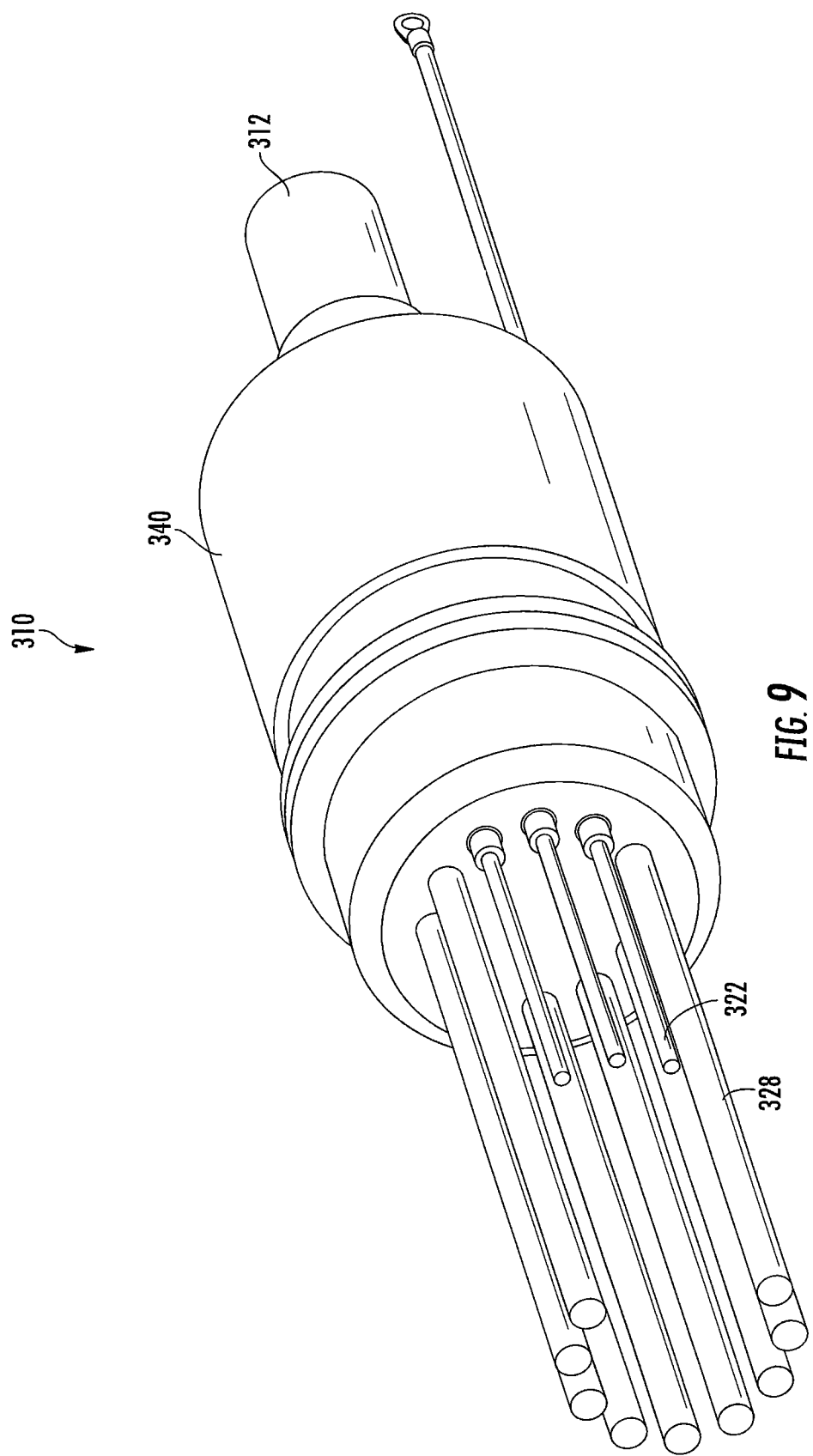
FIG. 9 is a rear perspective view of the transition assembly of FIG. 8.
Figure 10:
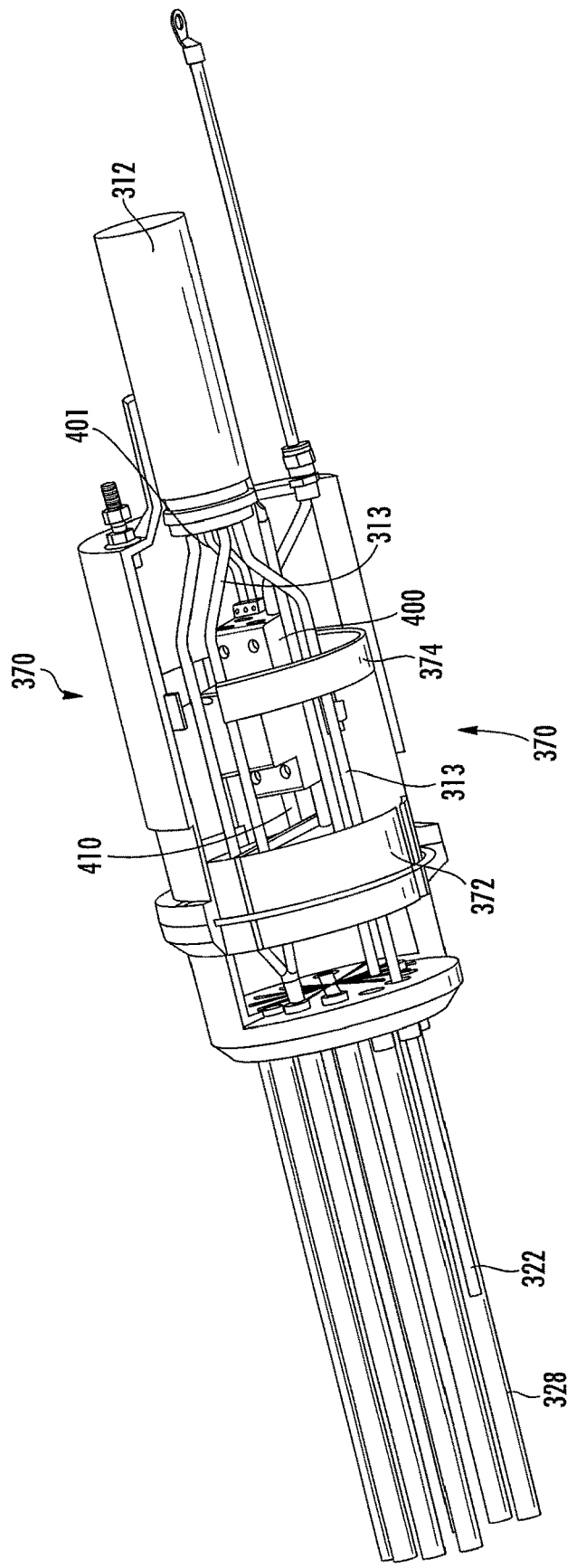
FIG. 10 is a cutaway side perspective view of the transition assembly of FIG. 8.
Figure 11:
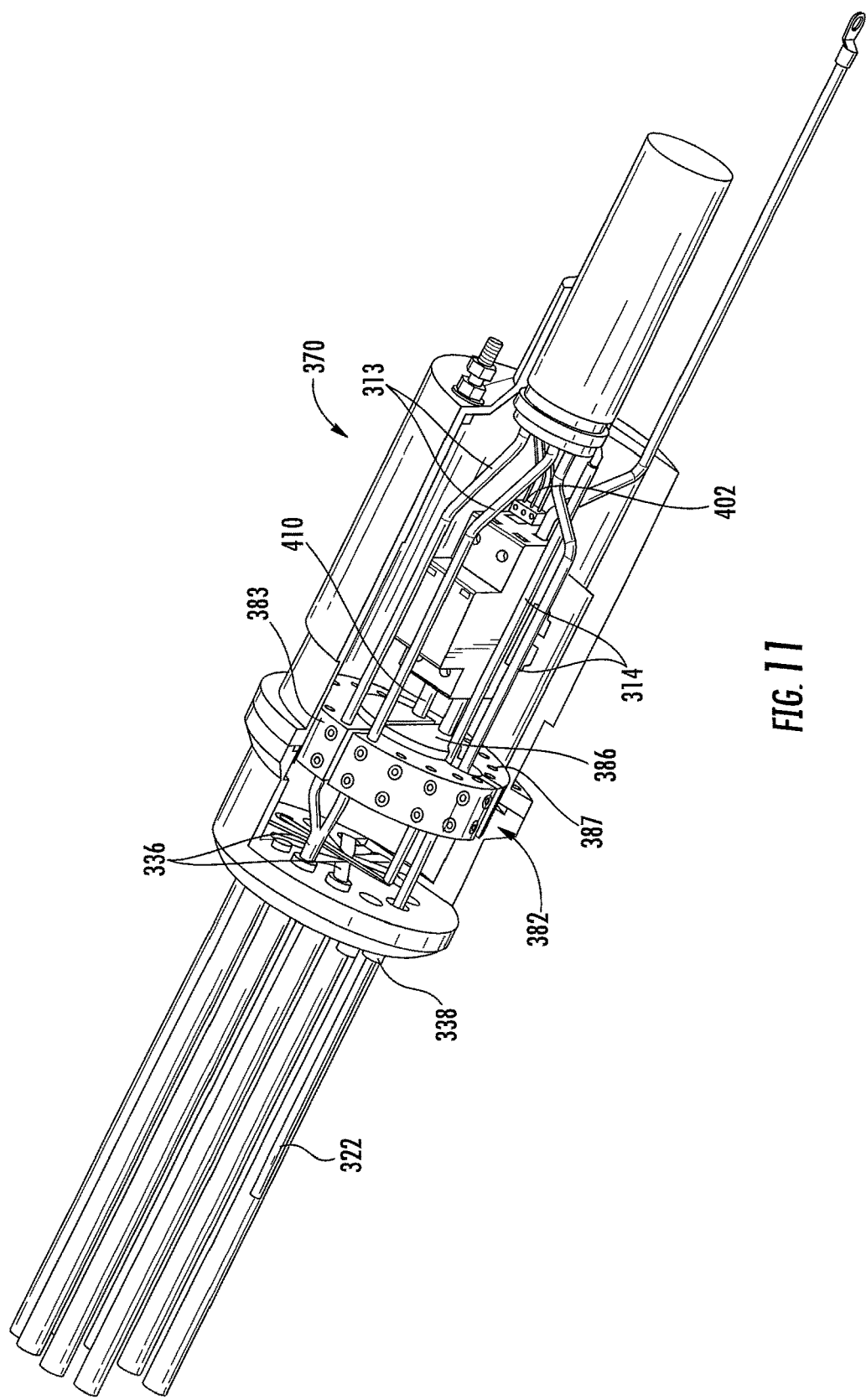
FIG. 11 is a cutaway front perspective view of the transition assembly of FIG. 8 with the contact mounting frame and OVP mounting frame removed for clarity.
Figure 12:
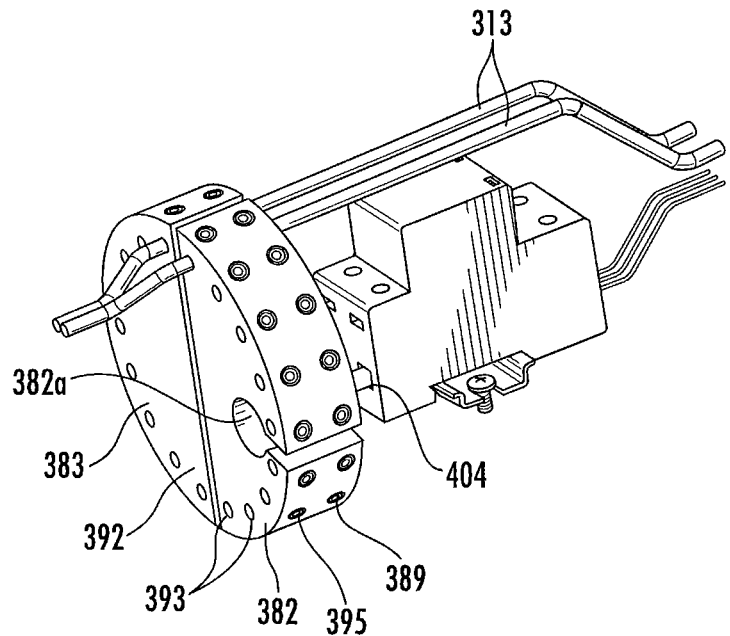
FIG. 12 is a rear perspective view of the OVP module of the transition assembly of FIG. 8.
Figure 13:
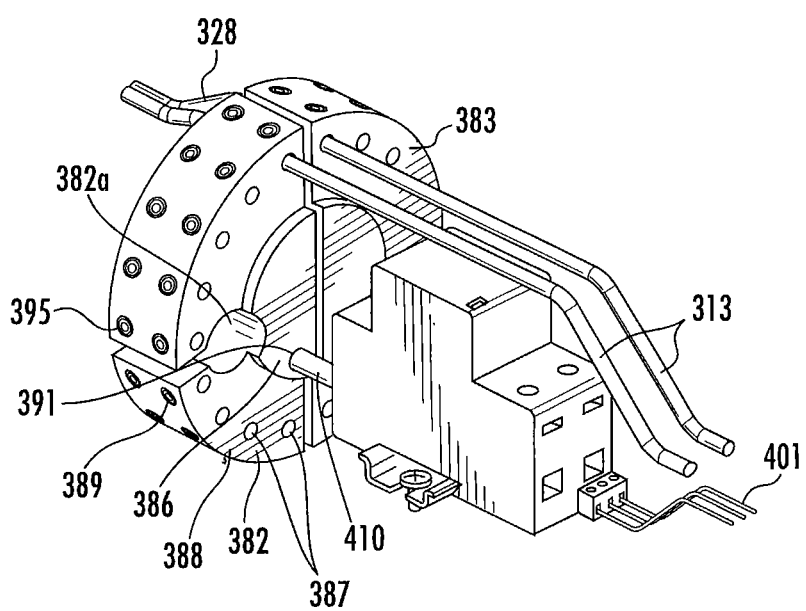
FIG. 13 is a front perspective view of the OVP module of FIG. 12.
Figure 14:
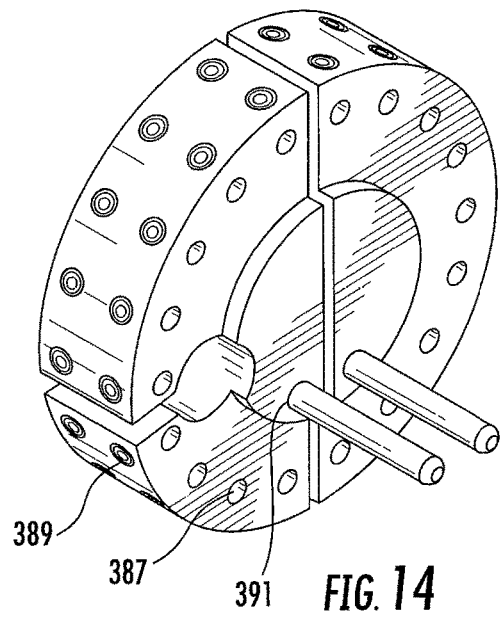
FIG. 14 is a front perspective view of the contacts of the OVP module of FIG. 12.
Figure 15:
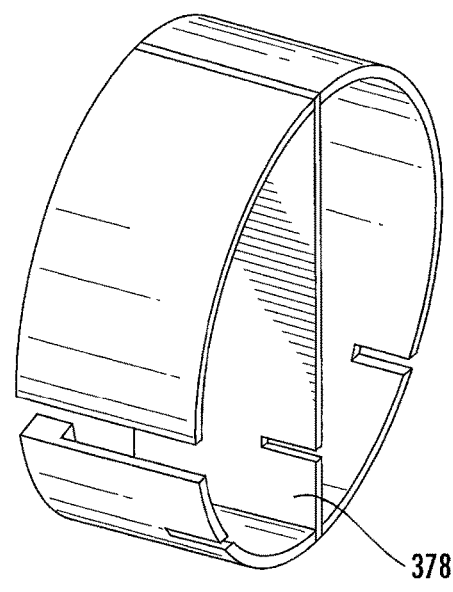
FIG. 15 is a front perspective view of the contact frame of the OVP module of FIG. 12.

Referring now to FIG. 7, an alternative embodiment of transition assembly 210' is shown therein. The transition assembly 210' has a power conductor subunit 220' like that of the power conductor subunit 220 illustrated in FIG. 6, but includes a single fiber optic subunit 116' with a single connector rather than two separate fiber subunits 116 with multiple connectors.

Referring now to FIGS. 8-16, another embodiment of a transition assembly, designated broadly at 310, is shown therein. Referring now to the drawings, a transition assembly, designated broadly at 10, is shown in FIGS. 1-4. Like the assembles 10, 110, 210, 210', the assembly 310 includes a hybrid trunk cable 312, a transition housing 340, power conductor 328, optical fibers 322, and an overprotection (OVP) module 370. The hybrid trunk cable 312 and transition housing 340 are similar to those described above.

Figure 16:
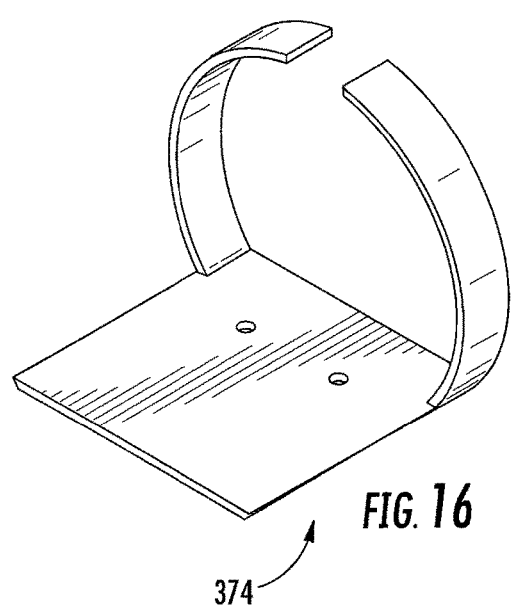
FIG. 16 is a rear perspective view of the OVP mounting frame for the OVP module of FIG. 12.

Within the cavity of the transition housing 340, the power conductors 313 of the hybrid trunk cable 312 are routed into the OVP module 370 (see FIGS. 10-13). The OVP module 370 includes a contact mounting frame 372 (FIG. 15) and an OVP mounting frame 374 (FIG. 16). The frames 372, 374 can be formed of a number of materials; typically the frames are formed of an electrically insulative material, such as a polymeric material.

Referring still to FIGS. 10-13, an OVP unit 400 is mounted on the OVP mounting frame 374, which in turn is mounted to the transition housing 340. The OVP unit 400 has three small holes 402 at one end and two holes 404 at the opposite end. The OVP unit 400, which is configured to create an open electrical circuit when experiencing a voltage higher than a predetermined threshold, can take a conventional form known to those of skill in this art and need not be described in detail herein.

Two semicircular contacts 382, 383 are mounted in the contact mounting frame 372. A respective semicircular projection 386 extends from the straight edge of each contact 382, 383. Receptacles 387 are located on an end surface 388 of each contact 382, 383; a securing hole 389 configured to receive a mounting screw (not shown) extends radially from the arcuate edge of each contact 382, 383 to meet a respective receptacle 387. A receptacle 391 is positioned on each projection 386. Also, receptacles 393 (FIG. 12) are located on the opposed end surface 392, and are associated with corresponding securing holes 395. Notably, a main panel 378 is positioned between the contacts 382, 383 to isolate these components from each other (see FIGS. 14 and 15 to envision how the contacts 382, 383 are mounted in the contact mounting frame 372).

As can be envisioned from FIGS. 11-16, the conductors 313 of the hybrid trunk cable 312 are separated. The conductors 313 are routed to a corresponding receptacle 387 in the one of the contacts 382, 383. An OVP conductor 410 is routed from each hole 404 in the OVP unit 400 to the receptacle 391 of the corresponding contact 382, 383. Also, the OVP unit 400 is attached to ground via small ground wires 401 that are inserted into holes 402 and routed to ground.

Power cords 328 are inserted into the receptacles 393 in the contacts 382, 383 and are routed from there out of the transition housing 340 through sleeves 336 (FIG. 11) in the end of the transition housing 340. Alternatively, the end of the transition housing 340 may be open, and the cavity filled with a potting compound (such as an epoxy) to protect the components inside the cavity. The power cords 328 are terminated with appropriate connectors or are fashioned into a form appropriate for termination into an RRU or similar equipment.

It can be seen that power signals travelling on the power conductors 313 reach the contacts 382, 383, where they are combined into two signals (one each for contacts 382 and 383); as noted above, the contacts 382, 383 are electrically isolated from each other by the main panel 378 of the contact mounting frame 372. These two combined signals are routed from their respective contacts 382, 383 to the power conductors 328. However, in the event of an overvoltage event, the connection of the contacts 382, 383 with the OVP unit 400 via the OVP conductors 410 can protect the equipment connected with the power conductors 328.

The optical fibers 314 of the hybrid trunk cable 312 are also routed through the transition housing 340. The contact 382 includes a recess 382a that provides space through which the optical fibers 314 can be routed. The optical fibers 314 exit the transition housing 340 via sleeves 338, glands or the like. Alternatively, the optical fibers 314 may be spliced with fiber optic cords via conventional splicing means mounted in the enclosure 340.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An overvoltage protection module (OVP module) configured to connect with a hybrid trunk cable, comprising:
    a mounting frame;
    an overvoltage unit mounted in the mounting frame and configured to create an open electrical circuit when experiencing a voltage higher than a predetermined threshold;
    a first contact mounted in the mounting frame and configured to receive a first set of power conductors from a hybrid trunk cable;
    a second contact mounted in the mounting frame in electrical isolation from the first contact, the second contact configured to receive a second set of power conductors from the hybrid trunk cable;
    a first OVP conductor connected between the first contact and the overvoltage unit;
    a second OVP conductor connected between the second contact and the overvoltage unit;
    a third contact mounted in the mounting frame and configured to receive a first set of power cords;
    a fourth contact mounted in the mounting frame in electrical isolation from the third contact, the fourth contact configured to receive a second set of power cords;
    a third OVP conductor connected between the overvoltage unit and the third contact; and
    a fourth OVP conductor connected between the overvoltage unit and the fourth contact.

2. The OVP module defined in claim 1, wherein the mounting frame includes a main panel, and wherein the OVP unit is mounted in the main panel.

3. The OVP module defined in claim 2, wherein the main panel isolates the first contact from the second contact, and also isolates the third contact from the fourth contact.

4. The OVP module defined in claim 1, wherein the mounting frame includes first and second rings, and wherein the first and second contacts are mounted in the first ring, and the third and fourth contacts are mounted in the second ring.

5. The OVP module defined in claim 1, wherein each of the first, second, third and fourth contacts is generally semicircular.

6. The OVP module defined in claim 1, wherein the first and second contacts are mounted on one end of the frame, and the third and fourth contacts are mounted on an opposite end of the frame.

7. A transition assembly for interconnecting a hybrid trunk cable and electronic equipment, comprising:
    an enclosure having first and second ends and a cavity;
    a hybrid trunk cable comprising first and second sets of pluralities of power conductors and a plurality of optical fibers, wherein the first and second sets of power conductors enter the enclosure at the first end;
    first and second sets of pluralities of power cords that exit the enclosure at the second end; and
    an overvoltage protection module (OVP module) comprising:
    a mounting frame;
    an overvoltage unit mounted in the mounting frame and configured to create an electrical short when experiencing a voltage higher than a predetermined threshold;
    a first contact mounted in the mounting frame and connected with the first set of power conductors;
    a second contact mounted in the mounting frame in electrical isolation from the first contact, the second contact connected with the second set of power conductors;
    a first OVP conductor connected between the first contact and the overvoltage unit;
    a second OVP conductor connected between the second contact and the overvoltage unit;
    a third contact mounted in the mounting frame and connected with the first set of power cords;
    a fourth contact mounted in the mounting frame in electrical isolation from the third contact, the fourth contact connected with the second set of power cords;
    a third OVP conductor connected between the overvoltage unit and the third contact; and
    a fourth OVP conductor connected between the overvoltage unit and the fourth contact.

8. The transition assembly defined in claim 7, wherein the optical fibers are broken out into fiber optic cords within the enclosure.

9. The transition assembly defined in claim 7, wherein the optical fibers are broken out into fiber optic cords remote from the enclosure.

10. The transition assembly defined in claim 9, wherein the optical fibers are broken out from the hybrid trunk cable as the first and second sets of power conductors are maintained together as a power subunit.

11. The transition assembly defined in claim 9, wherein the power subunit includes a connector that mates with a connector on the enclosure.

12. The transition assembly defined in claim 7, wherein the mounting frame includes a main panel, and wherein the OVP unit is mounted in the main panel.

13. The transition assembly defined in claim 12, wherein the main panel isolates the first contact from the second contact, and also isolates the third contact from the fourth contact.

14. The transition assembly defined in claim 7, wherein the mounting frame includes first and second rings, and wherein the first and second contacts are mounted in the first ring, and the third and fourth contacts are mounted in the second ring.

15. The transition assembly defined in claim 7, wherein each of the first, second, third and fourth contacts is generally semicircular.

16. The transition assembly defined in claim 7, wherein the first and second contacts are mounted on one end of the frame, and the third and fourth contacts are mounted on an opposite end of the frame.

17. A transition assembly for interconnecting a hybrid trunk cable and electronic equipment, comprising:

an enclosure having first and second ends, first and second side walls, and a cavity;

a hybrid trunk cable comprising first and second sets of pluralities of power conductors and a plurality of optical fibers, wherein the first and second sets of power conductors enter the enclosure at the first end; and an overvoltage protection module (OVP module) comprising:

an overvoltage unit mounted in the enclosure and configured to create an open electrical circuit when experiencing a voltage higher than a predetermined threshold;

a first contact mounted in the enclosure and connected with the first set of power conductors and with the connectors;

a second contact mounted in the enclosure in electrical isolation from the first contact, the second contact connected with the second set of power conductors and with the connectors;

a first OVP conductor connected between the first contact and the overvoltage unit; and a second OVP conductor connected between the second contact and the overvoltage unit wherein each of the first, second, third and fourth contacts is generally semicircular.

18. The transition assembly defined in claim 17, wherein the optical fibers are broken out into fiber optic cords within the enclosure.

* * * * *

UNITED STATES PATENT AND TRADEMARK OFFICE
CERTIFICATE OF CORRECTION

PATENT NO. : 10,447,025 B2
APPLICATION NO. : 15/409997
DATED : October 15, 2019
INVENTOR(S) : Islam et al.

Page 1 of 1

It is certified that error appears in the above-identified patent and that said Letters Patent is hereby corrected as shown below:

In the Claims

Column 10, Line 23, Claim 17:
Please correct "unit wherein" to read -- unit, wherein --

Signed and Sealed this
Thirty-first Day of December, 2019

Andrei Iancu
*Director of the United States Patent and Trademark Office*